(12) United States Patent
Chang

(10) Patent No.: US 8,774,848 B2
(45) Date of Patent: Jul. 8, 2014

(54) SYSTEM AND METHOD FOR ENHANCING CELL-EDGE PERFORMANCE IN A WIRELESS COMMUNICATION NETWORK

(75) Inventor: Rui Chu Chang, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 444 days.

(21) Appl. No.: 13/270,974

(22) Filed: Oct. 11, 2011

(65) Prior Publication Data

US 2013/0090143 A1     Apr. 11, 2013

(51) Int. Cl.
*H04B 7/00*     (2006.01)
*H04W 72/04*    (2009.01)
*H04W 72/12*    (2009.01)

(52) U.S. Cl.
CPC ............ *H04W 72/04* (2013.01); *H04W 72/042* (2013.01); *H04W 72/121* (2013.01)
USPC ........... 455/509; 455/450; 455/507; 455/512; 455/453; 455/426.1; 370/310; 370/328; 370/329; 370/338; 370/343

(58) Field of Classification Search
CPC . H04W 72/04; H04W 72/048; H04W 72/042; H04W 72/121
USPC ......... 455/509, 507, 508, 512, 513, 515, 500, 455/517, 524, 525, 450–453.2, 453, 446, 455/422.1, 403, 426.1, 426.2, 67.11, 455/423–425; 370/310, 328, 329, 338, 343
See application file for complete search history.

(56) References Cited

U.S. PATENT DOCUMENTS

| | | | |
|---|---|---|---|
| 7,738,422 B2 | 6/2010 | Das et al. | 370/330 |
| 2007/0177501 A1* | 8/2007 | Papasakellariou | 370/229 |
| 2008/0159323 A1 | 7/2008 | Rinne et al. | 370/431 |
| 2009/0042579 A1* | 2/2009 | Kitajima | 455/446 |
| 2009/0201867 A1 | 8/2009 | Teo et al. | 370/329 |
| 2009/0303956 A1 | 12/2009 | Chen et al. | 370/329 |
| 2010/0008282 A1 | 1/2010 | Bhattad et al. | 370/312 |
| 2010/0008317 A1 | 1/2010 | Bhattad et al. | 370/329 |
| 2010/0035645 A1 | 2/2010 | Chang et al. | 455/522 |
| 2010/0074200 A1 | 3/2010 | Li et al. | 370/329 |
| 2010/0080137 A1 | 4/2010 | Vedantham et al. | 370/252 |
| 2010/0081448 A1 | 4/2010 | Wong et al. | 455/452.1 |
| 2010/0097937 A1 | 4/2010 | Pietraski et al. | 370/241 |
| 2010/0238845 A1 | 9/2010 | Love et al. | 370/280 |
| 2010/0238901 A1 | 9/2010 | Sampath et al. | 370/331 |
| 2010/0323745 A1 | 12/2010 | Chen et al. | 455/522 |

(Continued)

FOREIGN PATENT DOCUMENTS

WO     WO 2010/148768     12/2010     ............ H04W 52/42

*Primary Examiner* — Keith Ferguson
(74) *Attorney, Agent, or Firm* — Baker Botts L.L.P.

(57) ABSTRACT

A method may include scheduling for the downlink control channel, by a first base station during a partial loading subframe, at least a first group of wireless communication devices present in the first cell, the first group of wireless communication devices comprising wireless communication devices determined by the first base station to be near an edge of the first cell. The method may additionally include scheduling for the downlink control channel, by the first base station during a normal loading sub-frame, at least one other group of wireless communication devices present in the first cell other than wireless communication devices in the first group of wireless communication devices, the at least one other group of wireless communication devices determined by the first base station to be in greater proximity to the first case station than wireless communication devices in the first class.

19 Claims, 4 Drawing Sheets

(56) References Cited

U.S. PATENT DOCUMENTS

| | | | |
|---|---|---|---|
| 2011/0003598 A1 | 1/2011 | Ma et al. | 455/452.1 |
| 2011/0075624 A1 | 3/2011 | Papasakellariou et al. | 370/329 |
| 2011/0081865 A1 | 4/2011 | Xiao et al. | 455/63.1 |
| 2011/0085457 A1 | 4/2011 | Chen et al. | 370/252 |
| 2011/0164489 A1 | 7/2011 | Papasakellariou et al. | 370/203 |
| 2011/0170496 A1 | 7/2011 | Fong et al. | 370/329 |
| 2011/0176497 A1 | 7/2011 | Gopalakrishnan | 370/329 |
| 2011/0188460 A1 | 8/2011 | Malladi et al. | 370/329 |

* cited by examiner

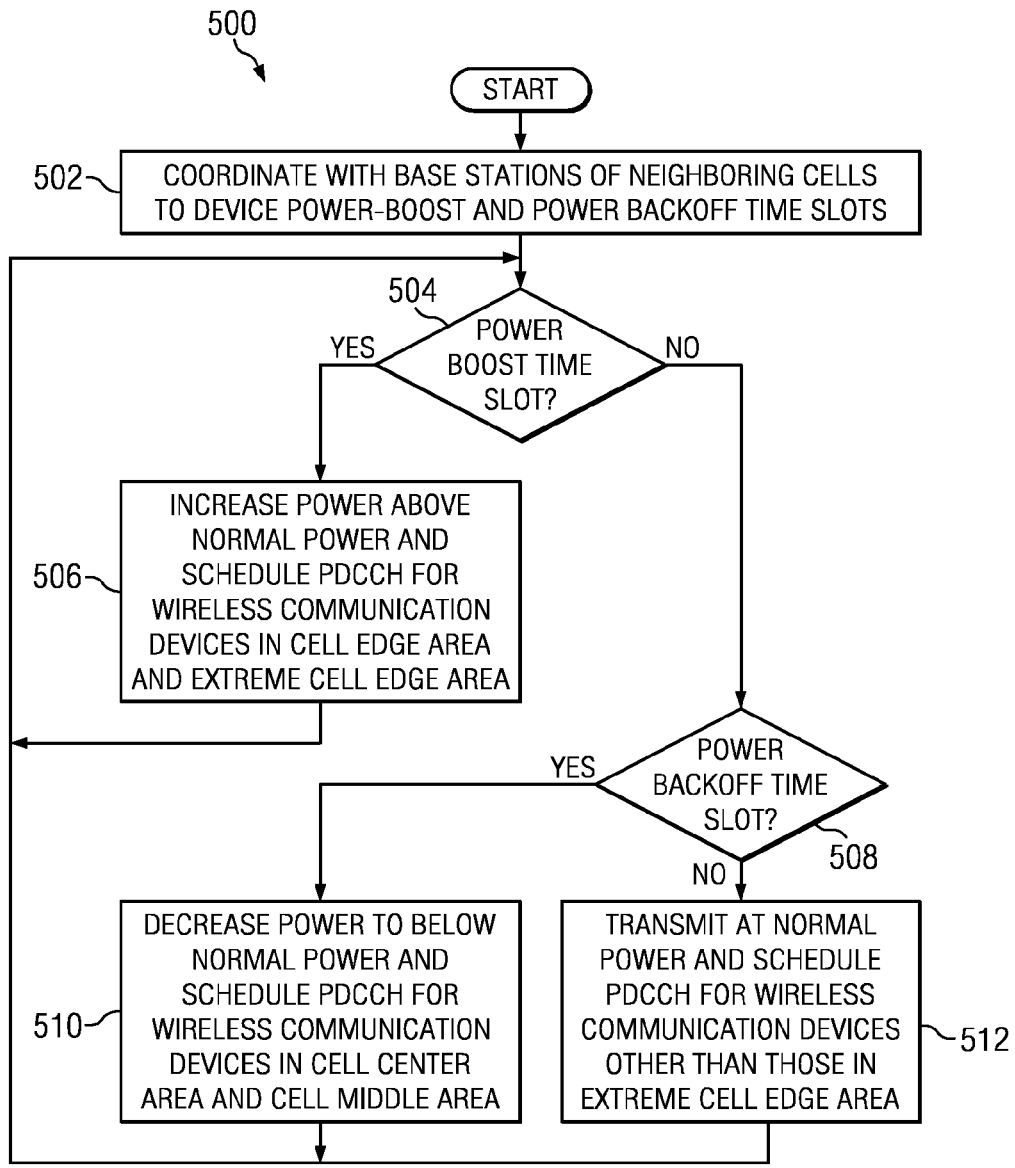
FIG. 5
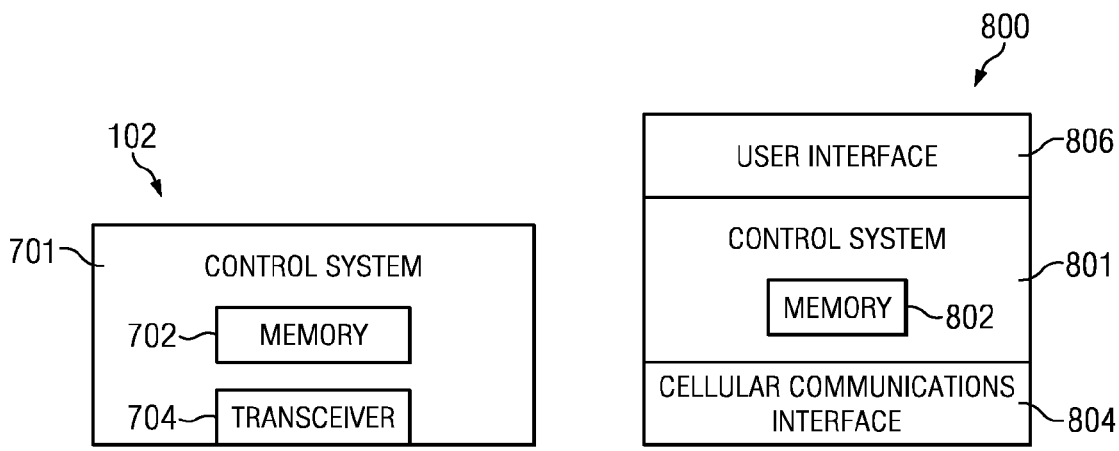
FIG. 7
FIG. 8

SYSTEM AND METHOD FOR ENHANCING CELL-EDGE PERFORMANCE IN A WIRELESS COMMUNICATION NETWORK

TECHNICAL FIELD

The present disclosure relates generally to wireless communication and, more particularly, to enhancing cell-edge performance in a wireless communication network.

BACKGROUND

Wireless communications systems are used in a variety of telecommunications systems, television, radio and other media systems, data communication networks, and other systems to convey information between remote points using wireless transmitters and wireless receivers. A transmitter is an electronic device which, usually with the aid of an antenna, propagates an electromagnetic signal such as radio, television, or other telecommunications. Transmitters often include signal amplifiers which receive a radio-frequency or other signal, amplify the signal by a predetermined gain, and communicate the amplified signal. On the other hand, a receiver is an electronic device which, also usually with the aid of an antenna, receives and processes a wireless electromagnetic signal. In certain instances, a transmitter and receiver may be combined into a single device called a transceiver.

3GPP Long Term Evolution (LTE) is a standard for wireless communication of high-speed data. Under the LTE standard, control data may be communicated from a wireless base station to a wireless communication device via a Physical Downlink Control Channel (PDCCH). A PDCCH is transmitted on one or an aggregation of several consecutive control channel elements (CCEs) during a control channel slot of a wireless communication sub-frame.

Recent research has indicated that wireless communication devices near the edge of a cell serviced by a base station may experience degradation in performance. Many solutions have been provided to solve problems related cell-edge degradation of traffic channel communication, but many of such solutions may not be effective to solve cell-edge degradation problems associated with control channels such as PDCCH, as traffic channels often exist in the form of resource blocks while a control channel may use CCEs spread across an entire available frequency bandwidth.

SUMMARY

In accordance with some embodiments of the present disclosure, a method may include identifying a first base station defining a first cell and at least two neighbor base stations of the first base station defining adjacent cells to the first cell. The method may also include determining whether to use cell edge enhancement. The method may further include classifying, by the first base station, wireless communication devices present in the first cell based on their proximity to the first base station. The method may additionally include coordinating, by the first base station in concert with the neighbor base stations, to define partial loading sub-frames and normal loading sub-frames for a downlink control channel. The method may also include scheduling for the downlink control channel, by the first base station during a partial loading sub-frame, at least a first group of wireless communication devices present in the first cell, the first group of wireless communication devices comprising wireless communication devices determined by the first base station to be near an edge of the first cell. The method may additionally include scheduling for the downlink control channel, by the first base station during a normal loading sub-frame, at least one other group of wireless communication devices present in the first cell other than wireless communication devices in the first group of wireless communication devices, the at least one other group of wireless communication devices determined by the first base station to be in greater proximity to the first case station than wireless communication devices in the first class.

Technical advantages of the present disclosure may be readily apparent to one skilled in the art from the figures, description and claims included herein.

BRIEF DESCRIPTION OF THE DRAWINGS

For a more complete understanding of the present disclosure and its features and advantages, reference is now made to the following description, taken in conjunction with the accompanying drawings, in which:

FIG. 5 illustrates a flow chart of an example method for PDCCH power boost and power back-off in a wireless communication system, in accordance with embodiments of the present disclosure;

FIG. 7 illustrates a block diagram of an example base station, in accordance with embodiments of the present disclosure; and FIG. 8 illustrates a block diagram of an example wireless communication device for use in wireless communication system, in accordance with embodiments of the present disclosure.

DETAILED DESCRIPTION

Figure 1:
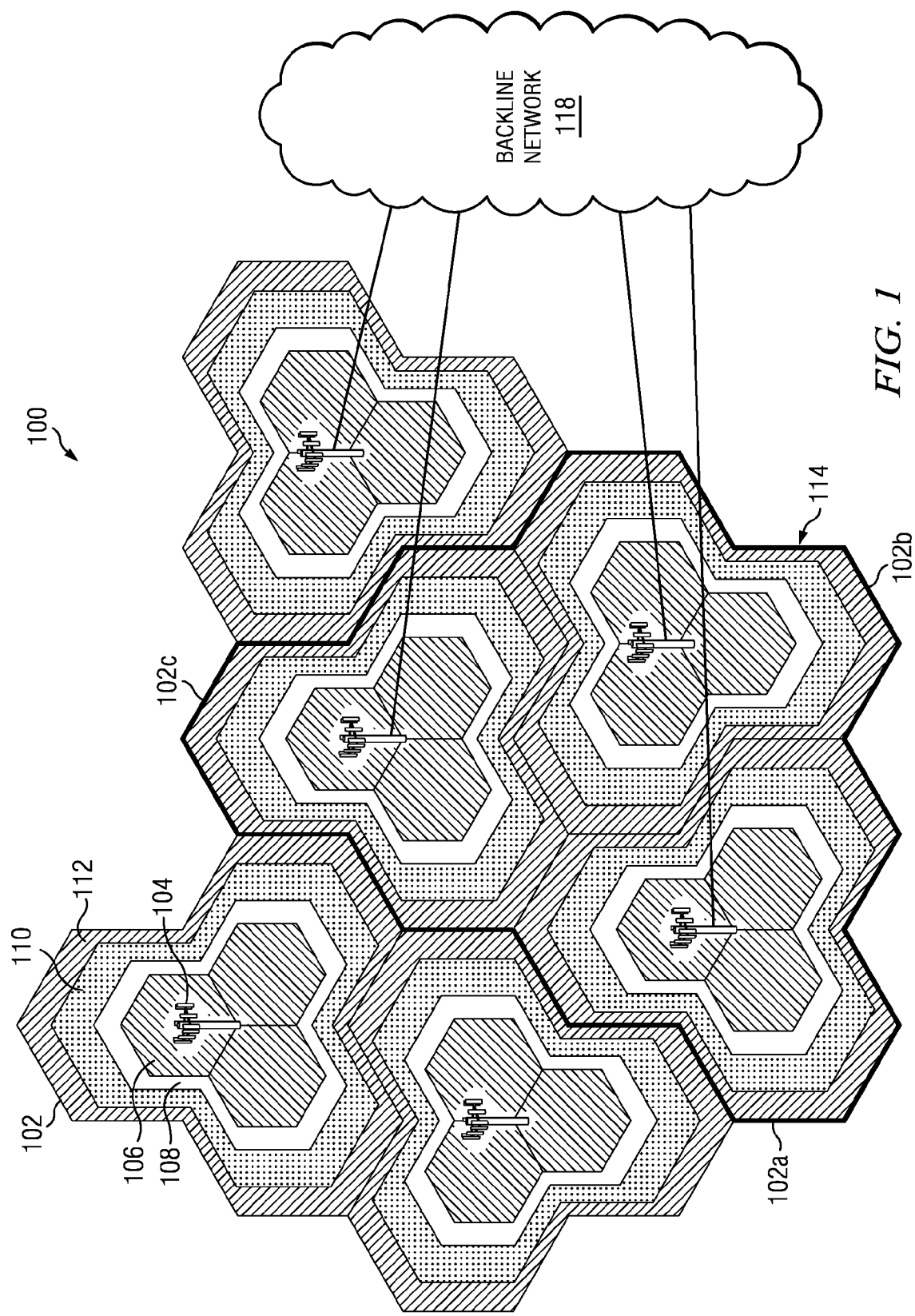
FIG. 1 illustrates a block diagram of an example wireless communication system, in accordance with embodiments of the present disclosure.

FIG. 1 illustrates a block diagram of an example wireless communication system 100, in accordance with certain embodiments of the present disclosure. In some embodiments, wireless communication system 100 may comprise a Long Term Evolution (LTE) cellular communications network or any other suitable communications network. As shown in FIG. 1, wireless communication system 100 may include a plurality of base stations 104 each forming a corresponding cell 102. While FIG. 1 displays a particular number of cells 102 and base stations 104, it is understood that system 100 may include any suitable number of cells and base stations 104. Base station 104 may be a fixed station and may also be referred to as an access point, a Node B evolved Node B (eNB), or some other terminology.

As depicted in FIG. 1, each cell 102 may include a cell center area 106, cell center-middle area 108, cell middle-edge area 110 and cell extreme edge area 112. In general, the extreme cell edge area 112 of a cell 102 may comprise an area of the cell 102 in which the Channel Quality Index (CQI) for communications links between wireless communication devices and base station 104 is within in certain range (e.g., CQI Index of 0-2 and/or CCE aggregation level between CCE-8 and outage). In this disclosure, the term "wireless communication device" may broadly refer to devices which may also be referred to a remote station, a mobile station, an access terminal, user equipment (UE), a terminal, a cellular phone, or some other terminology. Cell middle-edge area 110 may comprise an area in which the CQI for communications links is greater than that of extreme cell edge area 112 (e.g., CQI Index of 3-6 and/or aggregation level between CCE-4 and CCE-8). Cell center-middle area 108 may comprise an area in which the CQI for communications links is greater than that of cell middle-edge area 110 (e.g., CQI Index of 7-9 and/or aggregation level between CCE-2 and CCE-4). Cell center area 106 may comprise an area in which the CQI for communications links is greater than that of cell middle area 108 (e.g., CQI Index of 10-15 and/or aggregation level between CCE-1 and CCE-2). Wireless communication elements in use in system 100 may be classified according to which of these areas they fall into (e.g., based on determined CQI for each wireless communication element), as described in greater detail below. A wireless communications device that does not have a known CQI for a particular cell 104 (e.g., because the wireless communication device entered the particular cell 104 or system 100) may be suitably classified as a member of any of the cell area. In some embodiments, a wireless communication device without a known CQI will be classified as existing in cell center area 106 or cell middle area 108, until such time as the CQI for the wireless communication device is known. As described below, wireless communication devices may be scheduled for PDCCH based on the cell area classification described herein.

Adjacent cells 102 may be grouped into one of more groups 114. For example as shown in FIG. 1, a group 114 may include cells 102a, 102b, and 102c. While group 114 is depicted as including three cells, a group 114 may include any suitable number (e.g., greater or equal to 3) of cells.

In operation, base stations 104 may communicate with each other via backhaul network 118 to coordinate partial loading for PDCCH or coordinate power-boost and power-backoff for PDCCH. Backhaul network 118 may be a wired network (e.g., an Ethernet or fiber network), a wireless network, or a combination thereof.

Figure 2:
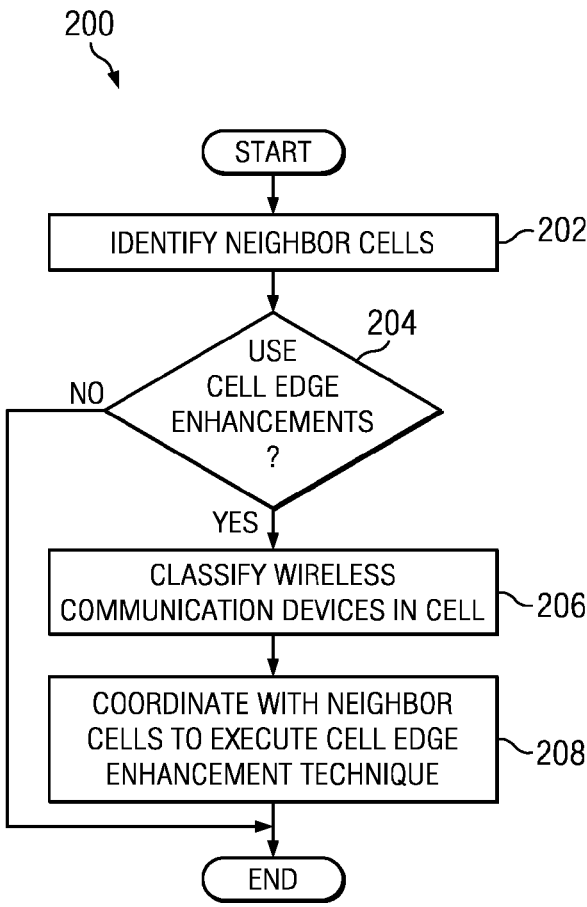
FIG. 2 illustrates a flow chart of an example method for enhancing cell-edge performance in a wireless communication system, in accordance with embodiments of the present disclosure.

FIG. 2 illustrates a flow chart of an example method 200 for enhancing cell-edge performance in a wireless communication system, in accordance with embodiments of the present disclosure. According to some embodiments, method 200 may begin at step 202. As noted above, teachings of the present disclosure may be implemented in a variety of configurations of system 100. As such, the preferred initialization point for method 200 and the order of the steps 202-208 comprising method 200 may depend on the implementation chosen.

At step 202 a base station 104 may identify its direct neighbor cells 102. A base station 104 may use any appropriate technique known in the art to determine the neighbor list, including by reference to a neighbor list and/or using automatic neighbor relation (ANR).

At step 204, base station 104 may determine whether to use a cell edge enhancement technique for PDCCH. Base station 104 may make such determination in any suitable manner. For example, in some embodiments, base station 104 make such determination based on radio link failure (RLF) statistics. In these and other embodiments, base station 104 may make a determination that cell edge enhancement for PDCCH should be used in response to traffic-channel Inter Cell Interference Coordination (ICIC) being utilized in the cell 102 defined by base station 104. If base station 104 determines cell enhancement is to be used for PDCCH, method 200 may proceed to step 206. Otherwise, method 200 may end.

At step 206, in response to a determination that a cell edge enhancement technique is to be used, base station 104 may classify the wireless communication devices to determine their proximity to a cell edge. For example, base station 104 may classify wireless communication devices as being in one of a cell center area 106, cell center-middle area 108, cell middle-edge area 110, and extreme cell edge area 112 by evaluating CQI values reported from each wireless communication device, and classifying wireless communication devices without CQI values as being in cell edge area 110 or extreme cell edge area 112.

At step 208, based on the classification if wireless communication devices, base station 104 may coordinate with other base stations of its neighbor cells to execute a cell edge enhancement technique. The cell edge enhancement technique may include one or more of coordinated partial loading (e.g., described below with respect to FIGS. 3 and 4), coordinated power boost and power backoff (e.g., described below with respect to FIGS. 5 and 6), and other suitable techniques. The cell edge enhancement technique selected may depend on network parameters. For example, if a particular network is experiencing a coverage-limited scenario, CCE-based power boosting, as known in the art, may be used. As another example, if a particular network is experiencing an interference-limited scenario, coordinated partial loading may be used. As a further example, if the network is neither in a coverage-limited scenario nor in an interference-limited scenario, coordinated power boost and power backoff may be used.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in a memory or other computer-readable media and executable by a processor or other suitable device.

Figure 3:
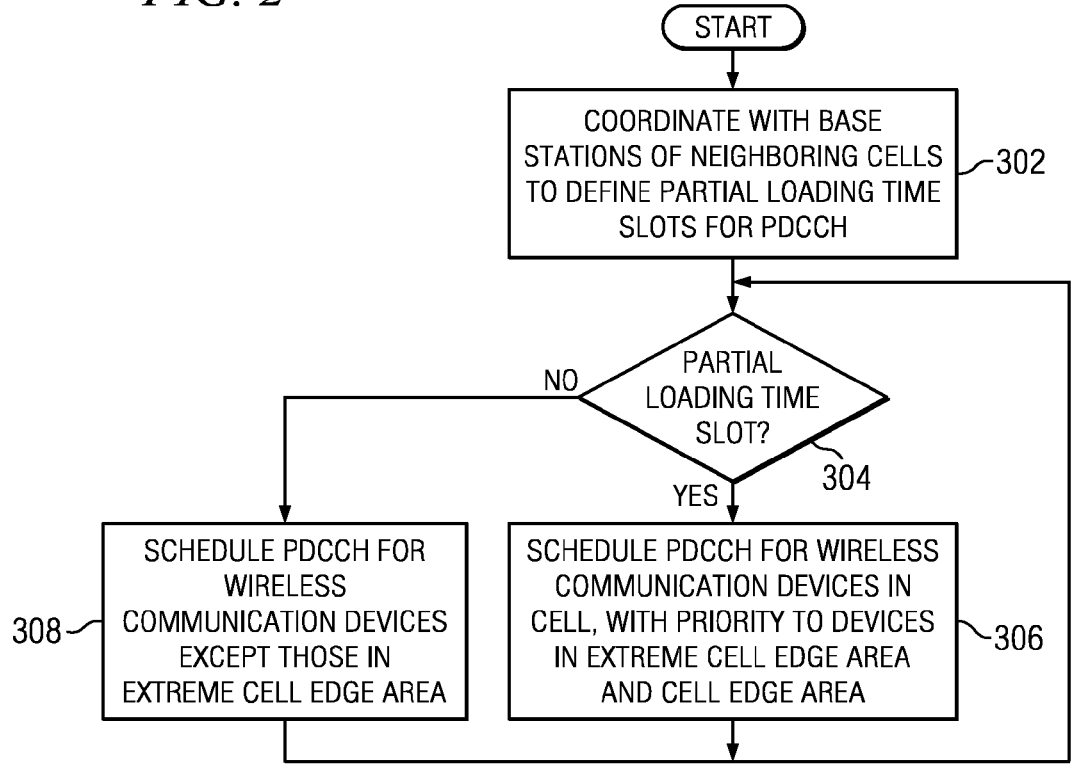
FIG. 3 illustrates a flow chart of an example method for PDCCH partial loading in a wireless communication system, in accordance with embodiments of the present disclosure.

FIG. 3 illustrates a flow chart of an example method 300 for PDCCH partial loading in a wireless communication system, in accordance with embodiments of the present disclosure. According to some embodiments, method 300 may begin at step 302. As noted above, teachings of the present disclosure may be implemented in a variety of configurations of system 100. As such, the preferred initialization point for method 300 and the order of the steps 302-308 comprising method 300 may depend on the implementation chosen.

At step 302, a base station 104 may coordinate with base stations 104 of neighboring cells 102 to define partial loading sub-frames (e.g., time slots) for PDCCH. In defining partial loading sub-frames for PDCCH, base stations 104 may select from PDCCH sub-frames, a subset of one or more PDCCH sub-frames to serve as partial loading sub-frames. For example, in one embodiment, base stations 104 may define one out of every four PDCCH sub-frames to be a partial loading sub-frame.

At step 304, during operation of the PDCCH partial loading technique, a base station 104 may determine if a present sub-frame is a partial loading sub-frame, as defined by the base station 102 and its neighboring base stations 102 at step 302. If the sub-frame is a partial loading sub-frame, method 300 may proceed to step 306. Otherwise, method 300 may proceed to step 308.

At step 306, in response to a determination that a present sub-frame is a partial loading sub-frame, base station 102 may schedule PDCCH for wireless communication devices in its corresponding cell 104 with priority given to devices in extreme cell edge area 112, then devices in cell edge area 112 at a loading level significantly less than its normal level (e.g., 30-33%) to avoid CCE collisions. After completion of step 306, method 300 may proceed again to step 304.

At step 308, in response to a determination that a present sub-frame is not a partial loading sub-frame, base station may schedule PDCCH for wireless communication devices in its corresponding cell 104 except for those in extreme cell edge area 112. After completion of step 308, method 300 may proceed again to step 304.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using system 100 or any other system operable to implement method 300. In certain embodiments, method 300 may be implemented partially or fully in software and/or firmware embodied in a memory or other computer-readable media and executable by a processor or other suitable device.

Figure 4:
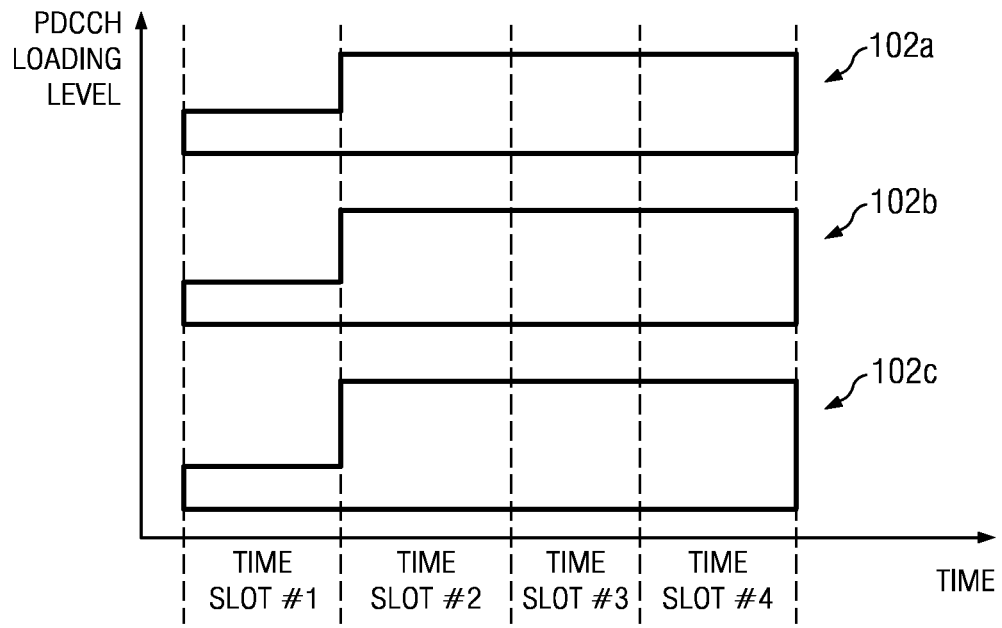
FIG. 4 illustrates a graph depicting an example application of the method depicted in FIG. 3, in accordance with embodiments of the present disclosure.

FIG. 4 shows an example graph depicting the application of method 300, in accordance with embodiments of the present disclosure. In the example shown in FIG. 4, one PDCCH sub-frame out of every four PDCCH sub-frames are defined as a partial loading sub-frame. Thus, in such example, wireless communication devices in extreme cell edge area 112 may be served one of every four sub-frames during partial loading. Wireless communication devices in cell edge area 110 may be served in all sub-frames, but with priority below that of devices in extreme cell edge area 112. Other wireless communication devices (e.g., those in cell center area 106 and cell middle area 108) may be served three of every four sub-frames (e.g., sub-frames with full loading).

FIG. 5 illustrates a flow chart of an example method 500 for PDCCH power boost and power back-off in wireless communication system 100, in accordance with embodiments of the present disclosure. According to some embodiments, method 500 may begin at step 502. As noted above, teachings of the present disclosure may be implemented in a variety of configurations of system 100. As such, the preferred initialization point for method 500 and the order of the steps 502-512 comprising method 500 may depend on the implementation chosen.

At step 502, a base station 104 may coordinate with base stations 104 of neighboring cells 102 to define power boost and power back-off sub-frames (e.g., sub-frames) for PDCCH for each cell. In defining partial loading sub-frames for PDCCH, base stations 104 may select from PDCCH sub-frames, a subset of one or more PDCCH sub-frames to serve as power boost sub-frames and a subset of one or more PDCCH sub-frames to serve as power back off sub-frames. Those sub-frames not designated as power boost sub-frames or power back-off slots may be designated as normal power sub-frames. In addition, base stations 104 of neighboring cells 102 may coordinate such that: (a) while one base station 104 of a cell 102 (e.g., 102a) is in a power boost sub-frame, directly neighboring cells 102 (e.g., 102b and 102c) are in a power back-off sub-frame; and (b) while one base station 104 of a cell 102 is in a normal power sub-frame, directly neighboring cells 102 are also in a normal power sub-frame. As a specific example, base stations 104 may group PDCCG sub-frames into groups of four, from which one sub-frame may serve as a power-boost sub-frame for a cell 102, two sub-frames may serve as power back off sub-frames for the same cell 102, and one sub-frame may serve as a normal power sub-frame for the cell 102.

At step 504, during operation of the PDCCH power boost/power back off technique, a base station 104 may determine if a present sub-frame is a power boost sub-frame, as defined by the base station 104 and its neighboring base stations 102 at step 502. If the sub-frame is a power boost sub-frame, method 500 may proceed to step 506. Otherwise, method 500 may proceed to step 508.

At step 506, in response to a determination that the present sub-frame is a power boost sub-frame, base station 104 may increase its downlink power above a normal operating downlink power and schedule PDCCH for wireless communication devices in cell edge area 110 and extreme cell edge area 112 of the cell 102 of the base station. In some embodiments, this downlink power increase may be in the range between 2 dB and 6 dB. In these and other embodiments, such power increase may be adjustable, based on network parameters. After completion of step 506, method 500 may proceed again to step 504.

At step 508, in response to a determination that the present sub-frame is not a power boost sub-frame, base station 104 may determine if the present sub-frame is a power back-off sub-frame. If the sub-frame is a power back off sub-frame, method 500 may proceed to step 510. Otherwise, method 500 may proceed to step 512.

At step 510, in response to a determination that the present sub-frame is a power back off slot, base station 104 may decrease its downlink power below the normal operating downlink power and schedule PDCCH for wireless communication devices in cell center area 106 and cell middle area 108. In some embodiments, this downlink power decrease may be in the range between 2 dB and 6 dB. In these and other embodiments, such power decrease may be adjustable, based on network parameters. In cells doing power backoff, base station 104 may increase the CCE-aggregation level by one or two levels to compensate for extra out-of-cell interference. After completion of step 510, method 500 may proceed again to step 504.

At step 512, in response to a determination that the present sub-frame is not a power back off slot or a power boost sub-frame, base station 104 may downlink transmit at its normal power and schedule PDCCH for wireless communication devices other than those in extreme cell edge area 112. After completion of step 512, method 500 may proceed again to step 504.

Although FIG. 5 discloses a particular number of steps to be taken with respect to method 500, method 500 may be executed with greater or lesser steps than those depicted in FIG. 5. In addition, although FIG. 5 discloses a certain order of steps to be taken with respect to method 500, the steps comprising method 500 may be completed in any suitable order.

Figure 6:
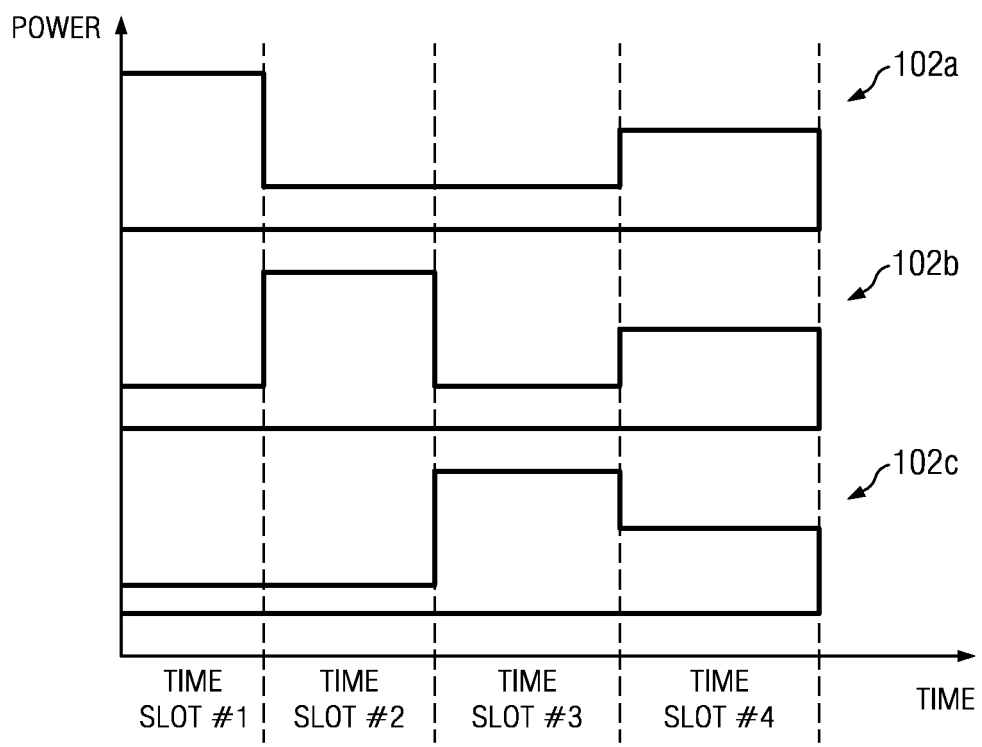
FIG. 6 illustrates a graph depicting an example application of the method depicted in FIG. 5, in accordance with embodiments of the present disclosure.

FIG. 6 shows an example graph depicting the application of method 500, in accordance with embodiments of the present disclosure. In the example shown in FIG. 6, one out of every four sub-frames are defined as a normal power slot for all base stations 102, while each of three out of every four sub-frames are defined as a power boost sub-frame for one base station and a power back-off sub-frame for base stations 102 of neighboring nodes. Under this scheme, wireless communication devices in cell center area 106 and cell middle area 108 are served three out of every four sub-frames (e.g., when their associated base station 102 is in a normal power sub-frame or a power back off sub-frame), communication devices in extreme cell edge area 112 are served one out of every four sub-frames (e.g., when their associated base station is in a power boost sub-frame), and wireless communication devices in cell edge area 110 are served one two of every four sub-frames (e.g., when their associated base station 102 is in a normal power sub-frame or a power boost sub-frame).

FIG. 7 illustrates a block diagram of an example base station 102, in accordance with embodiments of the present disclosure. Base station 102 may include a control system 701 having associated memory 702. In addition, base station 102 may include a transceiver 704. The functionality of base station 102 discussed above for providing cell edge enhancement (e.g., power boost, power back off, and partial loading) may be implemented in hardware forming part of control system 701, software stored in memory 702, or a combination thereof.

FIG. 8 illustrates a block diagram of an example wireless communication device 800 for use in wireless communication system 100, in accordance with embodiments of the present disclosure. Wireless communication device 800 may include a control system 801 having associated memory 802. In addition, wireless communication device 800 may include a cellular communications interface 804. The functionality of a wireless communication device discussed above with respect to providing cell edge enhancement (e.g., power boost, power back off, and partial loading) may be implemented within a protocol stack of cellular communications interface 804 implemented in software stored in memory 802, or a combination thereof. Wireless communication interface 800 may also include a user interface 806, which may include components such as, for example, one or more user input devices (e.g., microphone, keypad, or the like), one or more speakers, a display, or the like.

A component of wireless communication system 100 may include an interface, logic, memory, and/or other suitable element. An interface receives input, sends output, processes the input and/or output, and/or performs other suitable operations. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to wireless communication system 100 from the scope of the disclosure. The components of wireless communication system 100 may be integrated or separated. Moreover, the operations of wireless communication device may be performed by more, fewer, or other components. As used in this document, "each" refers to each member of a set or each member of a subset of a set.

Although the present disclosure has been described with several embodiments, various changes and modifications may be suggested to one skilled in the art. It is intended that the present disclosure encompass such changes and modifications as fall within the scope of the appended claims.

What is claimed is:

1. A method, comprising:
identifying a first base station defining a first cell and at least two neighbor base stations of the first base station defining adjacent cells to the first cell;
determining whether to use cell edge enhancement;
classifying, by the first base station, wireless communication devices present in the first cell based on their proximity to the first base station;
coordinating, by the first base station in concert with the neighbor base stations, to define partial loading sub-frames and normal loading sub-frames for a downlink control channel;
scheduling for the downlink control channel, by the first base station during a partial loading sub-frame, at least a first group of wireless communication devices present in the first cell, the first group of wireless communication devices comprising wireless communication devices determined by the first base station to be near an edge of the first cell; and
scheduling for the downlink control channel, by the first base station during a normal loading sub-frame, at least one other group of wireless communication devices present in the first cell other than wireless communication devices in the first group of wireless communication devices, the at least one other group of wireless communication devices determined by the first base station to be in greater proximity to the first case station than wireless communication devices in the first class.

2. A method according to claim 1, the downlink control channel comprising a Physical Downlink Control Channel (PDCCH) in accordance with the Long Term Evolution (LTE) standard.

3. A method according to claim 1, wherein classifying wireless communication devices present in the first cell comprises classifying wireless communication devices present in the first cell based on a Channel Quality Index associated with each of the wireless communication devices.

4. A method according to claim 1, wherein classifying wireless communication devices present in the first cell comprises classifying wireless communication devices present in the first cell based on an aggregation level associated with each of the wireless communication devices.

5. A method according to claim 1, wherein the at least one other classes includes at least a second group of wireless communication devices and a third group of communication devices, the second group of wireless communication devices determined to be in greater proximity to the first base station than the first group of wireless communication devices, and the third group of wireless communication devices determined to be in greater proximity to the first base station than the second group of wireless communication devices, the method further comprising:
scheduling for the downlink control channel, by the first base station during a partial loading sub-frame, the first group of wireless communication devices and the second group of wireless communication devices; and scheduling for the downlink control channel, by the first base station during a normal loading sub-frame, the second group of wireless communication devices and the third group of wireless communication devices.

6. A method according to claim 5, wherein during the partial loading sub-frame, the first base station gives priority to the first group of wireless communication devices over the second group of wireless devices.

7. A method according to claim 1, wherein during the partial loading sub-frame, the first base station schedules wireless communication devices for the downlink control channel at a first capacity lesser than a second capacity at which the first base station schedules wireless communication devices for the downlink control channel during the normal loading sub-frame.

8. A method according to claim 7, wherein the first capacity is approximately one-third of the second capacity.

9. A method according to claim 1, wherein coordinating to define partial loading sub-frames and normal loading sub-frames comprises defining one of every four downlink control channel sub-frames to be a partial loading sub-frame and three of every four downlink control channel sub-frames to be a normal loading sub-frame.

10. A method, comprising:
identifying a first base station defining a first cell and at least two neighbor base stations of the first base station defining adjacent cells to the first cell;
determining whether to use cell edge enhancement;
classifying, by the first base station, wireless communication devices present in the first cell based on their proximity to the first base station;
coordinating, by the first base station in concert with the neighbor base stations, to define for each of the first base station and the neighbor base stations power boost sub-frames, power back-off sub-frames, and normal power sub-frames;
scheduling for the downlink control channel, by the first base station during a power boost sub-frame, at least a first group of wireless communication devices present in the first cell, the first group of wireless communication devices comprising wireless communication devices determined by the first base station to be near an edge of the first cell;
transmitting during the power boost sub-frame at a first power;
scheduling for the downlink control channel, by the first base station during a power back off sub-frame, a second group of wireless communication devices present in the first cell other than wireless communication devices in the first group of wireless communication devices, the second group of wireless communication devices determined by the first base station to be in greater proximity to the first case station than wireless communication devices in the first class;
transmitting during the power back-off sub-frame at a second power lesser than the first power.

11. A method according to claim 10, the downlink control channel comprising a Physical Downlink Control Channel (PDCCH) in accordance with the Long Term Evolution (LTE) standard.

12. A method according to claim 10, wherein classifying wireless communication devices present in the first cell comprises classifying wireless communication devices present in the first cell based on a Channel Quality Index associated with each of the wireless communication devices.

13. A method according to claim 10, wherein classifying wireless communication devices present in the first cell comprises classifying wireless communication devices present in the first cell based on an aggregation level associated with each of the wireless communication devices.

14. A method according to claim 10, further comprising:
scheduling for the downlink control channel, by the first base station during a normal power sub-frame, the second group of wireless communication devices and a third group of wireless communication devices, the third group of wireless communication devices determined by the first base station to be in greater proximity to the first case station than wireless communication devices in the first group and in lesser proximity than wireless communication devices in the second class; and
transmitting during the normal sub-frame at a third power lesser than the first power and greater than the second power.

15. A method according to claim 10, wherein coordinating to define power boost sub-frames, power back-off sub-frames, and normal power sub-frames comprises defining power boost sub-frames and power back-off sub-frames such that:
when the first base station is in a power boost sub-frame, each of its neighbor base stations is in a power back-off sub-frame; and
when at least one of its neighbor base stations is in a power boost sub-frame, the first base station is in a power back-off sub-frame.

16. A method according to claim 10, wherein coordinating to define power boost sub-frames, power back-off sub-frames, and normal power sub-frames comprises defining normal power sub-frames such that when the first base station is in a normal power sub-frame, each of its neighbor base stations is in a normal power sub-frame.

17. A method according to claim 10, wherein coordinating to define power boost sub-frames, power back-off sub-frames, and normal power sub-frames comprises defining one of every four downlink control channel sub-frames to be a power boost sub-frame.

18. A method according to claim 10, wherein coordinating to define power boost sub-frames, power back-off sub-frames, and normal power sub-frames comprises defining one of every four downlink control channel sub-frames to be a normal power sub-frame.

19. A method according to claim 10, wherein coordinating to define power boost sub-frames, power back-off sub-frames, and normal power sub-frames comprises defining two of every four downlink control channel sub-frames to be a power back-off sub-frame.

\* \* \* \* \*